(12) United States Patent
Hagimoto et al.

(10) Patent No.: US 10,465,579 B2
(45) Date of Patent: *Nov. 5, 2019

(54) EXHAUST GAS CONTROL SYSTEM FOR INTERNAL COMBUSTION ENGINE

(71) Applicant: TOYOTA JIDOSHA KABUSHIKI KAISHA, Toyota-shi, Aichi-ken (JP)

(72) Inventors: Yuriko Hagimoto, Susono (JP); Yuji Miyoshi, Susono (JP); Hiromasa Nishioka, Susono (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 87 days.

This patent is subject to a terminal disclaimer.

(21) Appl. No.: 15/709,775

(22) Filed: Sep. 20, 2017

(65) Prior Publication Data

US 2018/0094558 A1    Apr. 5, 2018

(30) Foreign Application Priority Data

Sep. 30, 2016   (JP) .................................. 2016-194234

(51) Int. Cl.
*F01N 3/08*   (2006.01)
*F01N 3/20*   (2006.01)
*F01N 9/00*   (2006.01)

(52) U.S. Cl.
CPC ......... *F01N 3/0814* (2013.01); *F01N 3/0842* (2013.01); *F01N 3/208* (2013.01);
(Continued)

(58) Field of Classification Search
CPC . F01N 3/08; F01N 3/20; F01N 3/0814; F01N 3/208; F01N 2900/1402; F01N 2610/02; F01N 3/0842
See application file for complete search history.

(56) References Cited

U.S. PATENT DOCUMENTS

2008/0028829 A1* 2/2008 Sawada ................. F01N 3/0814
                                                            73/23.32
2010/0089039 A1   4/2010 Asanuma et al.
(Continued)

FOREIGN PATENT DOCUMENTS

CN      102089506 A      6/2011
JP      2008-286001      11/2008
(Continued)

OTHER PUBLICATIONS

U.S. Appl. No. 15/711,232, filed Sep. 21, 2017.
(Continued)

*Primary Examiner* — Patrick D Maines
(74) *Attorney, Agent, or Firm* — Finnegan, Henderson, Farabow, Garrett & Dunner, LLP

(57) ABSTRACT

When the temperature of an NSR catalyst belongs to a specified NSR temperature range and the temperature of an SCR catalyst belongs to a specified SCR temperature range, urea water is added, and specified air-fuel ratio processing relating to an air-fuel ratio of exhaust gas flowing into the NSR catalyst is executed. The specified air-fuel ratio processing includes i) a first air-fuel ratio processing to cause the air-fuel ratio of the exhaust gas flowing into the NSR catalyst to be a first lean air-fuel ratio that causes emission of occluded NOx from the NSR catalyst and ii) a second air-fuel ratio processing to cause the air-fuel ratio of the exhaust gas to be a second lean air-fuel ratio leaner than the first lean air-fuel ratio. In the specified air-fuel ratio processing, the first air-fuel ratio processing and the second air-fuel ratio processing are alternately repeated.

5 Claims, 7 Drawing Sheets

(52) U.S. Cl.
CPC ............ *F01N 9/00* (2013.01); *F01N 2430/06* (2013.01); *F01N 2610/02* (2013.01); *F01N 2610/03* (2013.01); *F01N 2900/1402* (2013.01); *F01N 2900/1602* (2013.01); *Y02T 10/24* (2013.01); *Y02T 10/47* (2013.01)

(56) References Cited

U.S. PATENT DOCUMENTS

| | | |
|---|---|---|
| 2011/0138783 A1 | 6/2011 | Sakurai |
| 2016/0177798 A1 | 6/2016 | Bisaiji et al. |
| 2016/0230628 A1* | 8/2016 | Hokuto ................. F01N 3/0814 |
| 2017/0037757 A1* | 2/2017 | Tanaka .................. F01N 3/101 |
| 2017/0167352 A1* | 6/2017 | Hagiwara ............. F01N 13/009 |
| 2017/0363029 A1* | 12/2017 | Boerensen ............ F01N 3/0842 |

FOREIGN PATENT DOCUMENTS

| | | |
|---|---|---|
| JP | 2009-41442 | 2/2009 |
| JP | 2015-34504 | 2/2015 |

OTHER PUBLICATIONS

Notice of Allowance issued in U.S. Appl. No. 15/711,232 dated Apr. 17, 2019.

Notice of Allowance issued in U.S. Appl. No. 15/711,232 dated Jul. 31, 2019.

\* cited by examiner

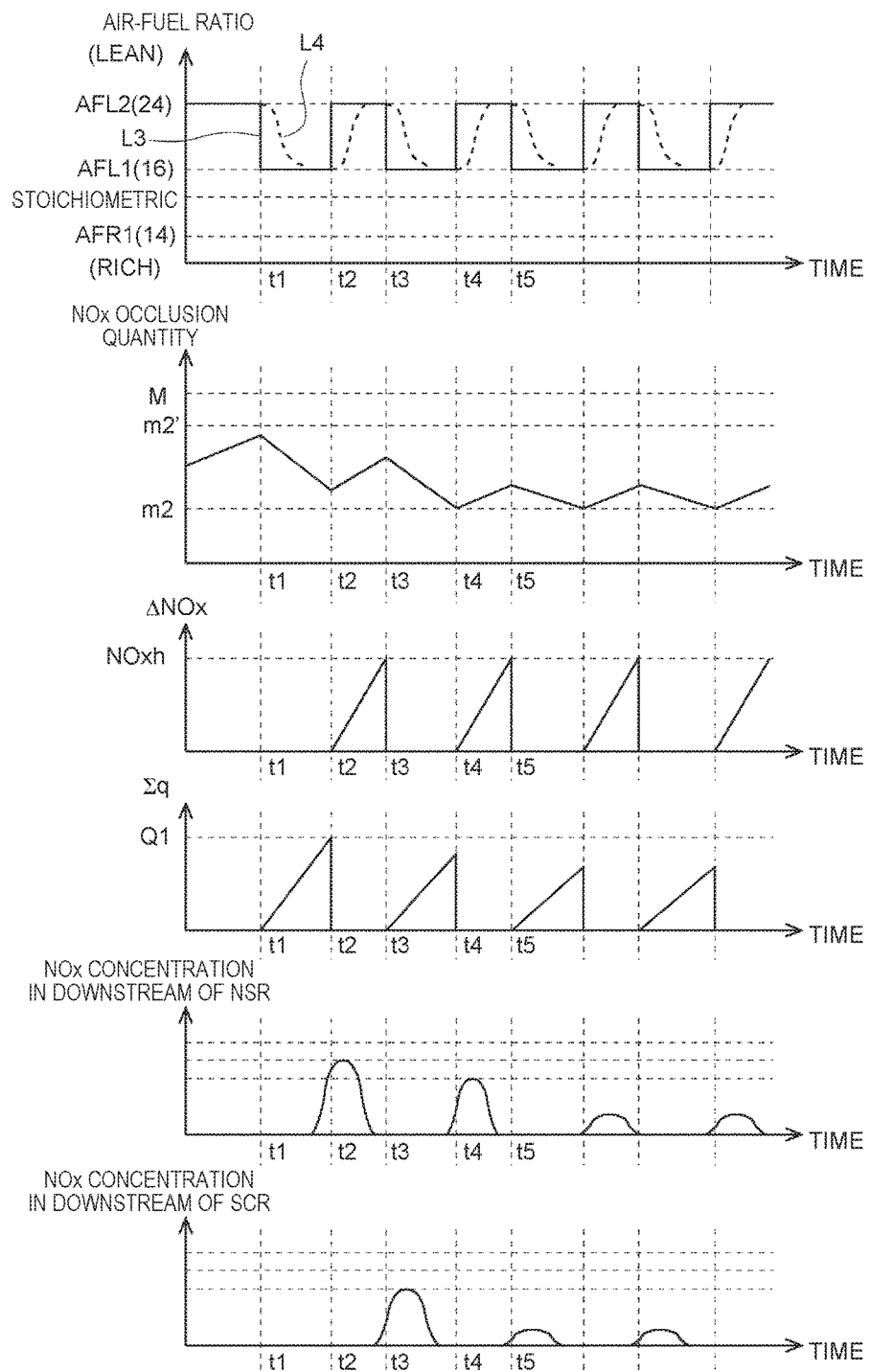

EXHAUST GAS CONTROL SYSTEM FOR INTERNAL COMBUSTION ENGINE

INCORPORATION BY REFERENCE

The disclosure of Japanese Patent Application No. 2016-194234 filed on Sep. 30, 2016 including the specification, drawings and abstract is incorporated herein by reference in its entirety.

BACKGROUND

1. Technical Field

The present disclosure relates to an exhaust gas control system for an internal combustion engine.

2. Description of Related Art

An exhaust passage of the internal combustion engine including an NSR catalyst that is a NOx storage reduction catalyst and an SCR catalyst that is a selective reduction type $NO_x$ catalyst may be adopted, the NSR catalyst and the SCR catalyst being disposed on an upstream and a downstream side of the exhaust passage, respectively. In such an exhaust gas configuration, the NSR catalyst occludes $NO_x$ in exhaust gas when an air-fuel ratio of the exhaust gas is a lean air-fuel ratio, and when the air-fuel ratio of the exhaust gas flowing into the NSR catalyst is temporarily adjusted to be a rich air-fuel ratio, the occluded $NO_x$ is emitted from the NSR catalyst and is reduced in a reaction with a reducing agent in the exhaust gas. As the exhaust gas flows into the SCR catalyst, ammonia is supplied as a reducing agent to the SCR catalyst, which causes selective reduction of $NO_x$ in the exhaust gas.

For example, in an exhaust gas configuration of an internal combustion engine disclosed in Japanese Patent Application Publication No. 2008-286001, an exhaust passage is equipped with an NSR catalyst and an SCR catalyst disposed in order from the upstream side. In order to emit and reduce the $NO_x$ occluded in the NSR catalyst, fuel is supplied to the exhaust gas. At that time, the $NO_x$ flowing from the NSR catalyst to the downstream side is reduced in the SCR catalyst. A supply quantity of ammonia required for reduction of $NO_x$ in the SCR catalyst is determined in consideration of the quantity of $NO_x$ occluded in the NSR catalyst as well as a conversion phenomenon of $NO_x$ to ammonia during $NO_x$ emission. Accordingly, excessive addition of ammonia to the SCR catalyst is avoided.

SUMMARY

When an exhaust gas control system is constructed to reduce $NO_x$ using an NSR catalyst and an SCR catalyst which are disposed in order from the upstream side in an exhaust passage of an internal combustion engine, it is necessary for efficient $NO_x$ reduction in the SCR catalyst to adjust an air-fuel ratio of the exhaust gas flowing into the SCR catalyst to be a lean air-fuel ratio at which oxygen is contained to some extent. This is considered to be because the valence of a reducing metal element (for example, copper Cu or the like) carried on a base material due to ion exchange in the SCR catalyst needs to be a valence required for a reduction reaction with oxygen. Accordingly, when the exhaust gas flowing into the NSR catalyst on the upstream side to emit and reduce occluded $NO_x$ is adjusted to be a specified rich air-fuel ratio, an air-fuel ratio atmosphere suitable for the reduction reaction of $NO_x$ is not formed in the SCR catalyst positioned on the downstream side. Accordingly, it can become difficult to continuously reduce the $NO_x$ flowing out from the upstream side in the SCR catalyst.

Accordingly, the present disclosure provides a technology for an exhaust gas control system having an NSR catalyst and an SCR catalyst disposed in order from the upstream side in an exhaust passage of an internal combustion engine, the technology implementing adequate use of both the catalysts to enhance $NO_x$ purification capacity as a system.

An inventor of the present disclosure employed the configuration of alternately repeating the air-fuel ratio processing to emit $NO_x$ occluded in the $NO_x$ catalyst and the air-fuel ratio processing to recover a $NO_x$ reduction capacity of the SCR catalyst. As a consequence, a margin is constantly given to the quantity of $NO_x$ occlusion in the NSR catalyst, while the $NO_x$ emitted from the NSR catalyst is reduced in the SCR catalyst, and the $NO_x$ reduction capacity of the SCR catalyst is also recovered. In the present disclosure, occlusion of $NO_x$ by the NSR catalyst includes the form of a so-called adsorption of $NO_x$.

More specifically, the present disclosure is an exhaust gas control system for an internal combustion engine including: an NSR catalyst that is a NOx storage reduction catalyst provided in an exhaust passage of the internal combustion engine; fuel supply means for supplying fuel to exhaust gas flowing into the NSR catalyst and regulating an air-fuel ratio of the exhaust gas; an SCR catalyst provided on a downstream side of the NSR catalyst in the exhaust passage, the SCR catalyst being configured to selectively reduce $NO_x$ with ammonia as a reducing agent; addition means for adding ammonia or a precursor of ammonia as an additive to the exhaust gas flowing into the SCR catalyst; and reduction control means for, when temperature of the NSR catalyst is within a specified NSR temperature range where $NO_x$ can be reduced by the NSR catalyst, and temperature of the SCR catalyst is within a specified SCR temperature range where $NO_x$ can be reduced by the SCR catalyst, adding the additive with the addition means, and executing specified air-fuel ratio processing relating to the air-fuel ratio of the exhaust gas flowing into the NSR catalyst with the fuel supply means. The specified air-fuel ratio processing includes a first lean air-fuel ratio processing and a second lean air-fuel ratio processing, the first lean air-fuel ratio processing being processing where fuel supply by the fuel supply means causes the air-fuel ratio of the exhaust gas flowing into the NSR catalyst to be a first lean air-fuel ratio leaner than a theoretical air fuel ratio, the first lean air-fuel ratio causing emission of the $NO_x$ occluded in the NSR catalyst, the second air-fuel ratio processing being processing where fuel supply by the fuel supply means is controlled so as to cause the air-fuel ratio of the exhaust gas flowing into the NSR catalyst to be a second lean air-fuel ratio leaner than the first lean air-fuel ratio. The reduction control means repeatedly performs the first air-fuel ratio processing and the second air-fuel ratio processing in an alternate manner in the specified air-fuel ratio processing. The present disclosure may also be defined as follows. An exhaust gas control system includes: an NSR catalyst that is a NOx storage reduction catalyst provided in an exhaust passage of an internal combustion engine; a fuel supply device configured to supply fuel to exhaust gas flowing into the NSR catalyst and control an air-fuel ratio of the exhaust gas; an SCR catalyst provided on a downstream side of the NSR catalyst in the exhaust passage, the SCR catalyst being configured to selectively reduce $NO_x$ with ammonia as a reducing agent;

an addition device configured to add one of ammonia and a precursor of ammonia as an additive to the exhaust gas flowing into the SCR catalyst; and an electronic control unit configured to, when temperature of the NSR catalyst is a temperature in a specified NSR temperature range where $NO_x$ is reduced by the NSR catalyst, and temperature of the SCR catalyst is a temperature in a specified SCR temperature range where $NO_x$ is reduced by the SCR catalyst, i) add the additive by the addition device, and ii) repeatedly perform first air-fuel ratio processing and second air-fuel ratio processing in an alternate manner, the first air-fuel ratio processing being processing where fuel supply by the fuel supply device is controlled such that the air-fuel ratio of the exhaust gas flowing into the NSR catalyst becomes a first lean air-fuel ratio leaner than a theoretical air fuel ratio, the first lean air-fuel ratio being an air-fuel ratio that causes emission of occluded $NO_x$ from the NSR catalyst, the second air-fuel ratio processing being processing where fuel supply by the fuel supply device is controlled such that the air-fuel ratio of the exhaust gas flowing into the NSR catalyst becomes a second lean air-fuel ratio leaner than the first lean air-fuel ratio.

In the exhaust gas control system for an internal combustion engine according to the present disclosure, an NSR catalyst that is a NOx storage reduction catalyst and an SCR catalyst that is a selective reduction type $NO_x$ catalyst are disposed in order from the upstream side in the exhaust passage. The NSR catalyst occludes $NO_x$ in a lean atmosphere, and uses the fuel supplied by the fuel supply means as a reducing agent. As a result, $NO_x$ reduction by the NSR catalyst can be achieved. More specifically, fuel is supplied by the fuel supply means to adjust the air-fuel ratio of the exhaust gas to be a specified rich air-fuel ratio, and when the exhaust gas having the specified rich air-fuel ratio flows into the NSR catalyst, $NO_x$ occluded in the NSR catalyst can be reduced with the fuel as a reducing agent. In the SCR catalyst, with use of an additive added by the addition means, $NO_x$ reduction can be performed with ammonia as a reducing agent.

Here, in the exhaust gas control system of the present disclosure, the temperature of the NSR catalyst and the SCR catalyst varies in accordance with the operating state of the internal combustion engine. When the temperature of the NSR catalyst belongs to a specified NSR temperature range, and the temperature of the SCR catalyst belongs to a specified SCR temperature range in particular, $NO_x$ in exhaust gas can be reduced using both the $NO_x$ reduction capacity of the NSR catalyst and the $NO_x$ reduction capacity of the SCR catalyst. However, when occluded $NO_x$ was reduced in the NSR catalyst in the past, the air-fuel ratio of the exhaust gas flowing into the NSR catalyst was simply adjusted to be a specified rich air-fuel ratio. Since the SCR catalyst was positioned downstream from the NSR catalyst, the exhaust gas surrounding the SCR catalyst did not have an air-fuel ratio adequate for $NO_x$ reduction. As a result, it was difficult to sufficiently enhance the $NO_x$ purification capacity of the exhaust gas control system.

Accordingly, in the exhaust gas control system of the present disclosure, even when the $NO_x$ reduction capacity of both the catalysts is available, NSR catalyst-based $NO_x$ reduction, which is performed by adjusting the air-fuel ratio of the exhaust gas flowing into the NSR catalyst to be a specified rich air-fuel ratio, is not performed. Rather, SCR catalyst-based $NO_x$ reduction is performed not by adjusting the air-fuel ratio of the exhaust gas flowing into the NSR catalyst to be the specified rich air-fuel ratio but by adding an additive to the exhaust gas. Since $NO_x$ reduction by the SCR catalyst is selective $NO_x$ reduction with ammonia as a reducing agent, efficiency of $NO_x$ reduction is relatively high and therefore the $NO_x$ purification capacity of the exhaust gas control system can easily be enhanced. Furthermore, when the SCR catalyst-based $NO_x$ reduction is performed, the quantity of fuel supply to the exhaust gas can be reduced, and discharge of fuel components to the outside of the system can be suppressed. When $NO_x$ reduction by the SCR catalyst is preferentially performed, the air-fuel ratio of the exhaust gas becomes a lean air-fuel ratio. Accordingly, the $NO_x$ occlusion quantity in the NSR catalyst is kept at high levels, which may cause sudden emission of a large quantity of $NO_x$ that is too large for the SCR catalyst to reduce when load of the internal combustion engine fluctuates. Accordingly, in the exhaust gas control system, in consideration of a $NO_x$ reduction reaction in the SCR catalyst, the air-fuel ratio processing is executed as specified air-fuel ratio processing relating to the air-fuel ratio of the exhaust gas flowing into the NSR catalyst for the SCR catalyst-based $NO_x$ reduction, the air-fuel ratio processing including first air-fuel ratio processing and second air-fuel ratio processing.

The first air-fuel ratio processing causes the air-fuel ratio of exhaust gas flowing into the NSR catalyst to be a first lean air-fuel ratio. The first lean air-fuel ratio is leaner than the theoretical air fuel ratio. The first lean air-fuel ratio can cause emission of $NO_x$ occluded in the NSR catalyst. Accordingly, when the first air-fuel ratio processing is performed, the occluded $NO_x$ is emitted from the NSR catalyst at an emission speed ($NO_x$ emissions per unit time) controlled to be relatively low. The $NO_x$ occlusion quantity naturally decreases with emission of the occluded $NO_x$. Most of the emitted $NO_x$ is not reduced by the NSR catalyst but flows out to the downstream side. Here, while the first air-fuel ratio processing is performed, the air-fuel ratio of the exhaust gas flowing into the SCR catalyst also becomes a lean air-fuel ratio attributed to the first lean air-fuel ratio. Accordingly, the $NO_x$ reduction capacity of the SCR catalyst may be demonstrated. However, since fuel supply is performed by the fuel supply means in order to form the first lean air-fuel ratio, it is hard to smoothly recover the ion valence of a reducing metal element in the SCR catalyst as compared with the case where fuel supply is not performed. This indicates that the $NO_x$ reduction capacity of the SCR catalyst may deteriorate as the first air-fuel ratio processing continues.

Accordingly, in the specified air-fuel ratio processing, the second air-fuel ratio processing is executed after the first air-fuel ratio processing is performed. The second air-fuel ratio processing causes the air-fuel ratio of the exhaust gas flowing into the NSR catalyst to be a second lean air-fuel ratio that is leaner than the first lean air-fuel ratio. As a result, the speed of $NO_x$ emitted from the NSR catalyst decreases or the $NO_x$ emission substantially stops. At the same time, feeding the exhaust gas containing more oxygen into the SCR catalyst makes it possible to achieve effective recovery of the ion valence of the reducing metal element in the SCR catalyst. In the second air-fuel ratio processing, fuel supply by the fuel supply means may be stopped so as to adjust the air-fuel ratio of the exhaust gas flowing into the NSR catalyst to be the second lean air-fuel ratio. In this case, since the air-fuel ratio of the exhaust gas is adjusted to be a lean air-fuel ratio as much as possible, recovery of the ion valence of the reducing metal element in the SCR catalyst is achieved more swiftly. Since the second air-fuel ratio processing recovers the ion valence of the reducing metal element in the SCR catalyst in this way, the state where the $NO_x$ can be reduced by the SCR catalyst can be formed again even in the case where the first air-fuel ratio processing is performed again after the end of the second air-fuel ratio processing as described later.

In the specified exhaust gas air-fuel ratio processing, the first air-fuel ratio processing and the second air-fuel ratio processing are alternately repeated. More specifically, in the NSR catalyst, emission of the occluded $NO_x$ is mainly performed due to the first air-fuel ratio processing. After the emission of the occluded $NO_x$, the emitted $NO_x$ is reduced in the SCR catalyst. Then, the second air-fuel ratio processing is performed following the first air-fuel ratio processing, so that the ion valence of the reducing metal element in the SCR catalyst is in the state suitable for $NO_x$ reduction. At this time, $NO_x$ reduction by the SCR catalyst is also efficiently performed. In such repetition of the first air-fuel ratio processing and the second air-fuel ratio processing, $NO_x$ reduction is mainly performed by the SCR catalyst. As for the $NO_x$ occlusion quantity in the NSR catalyst, the $NO_x$ occlusion quantity is quantitatively decreased by the first air-fuel ratio processing, while the $NO_x$ occlusion quantity is increased by the second air-fuel ratio processing. Accordingly, the reduction control means preferably executes the specified air-fuel ratio processing such that the $NO_x$ occlusion quantity in the NSR catalyst belongs to a specified $NO_x$ occlusion quantity range. As a consequence, the NSR catalyst can secure a margin that allows $NO_x$ occlusion, and an outflow of $NO_x$ from the NSR catalyst due to such reasons as increase in load of the internal combustion engine can be suppressed as much as possible.

As described in the foregoing, when $NO_x$ reduction is performed by the reduction control means, execution of the specified air-fuel ratio processing implements SCR catalyst-based efficient $NO_x$ reduction. As a result, both the catalysts are adequately used to enhance the $NO_x$ purification capacity as a system.

In the exhaust gas control system according to the present disclosure, when the temperature of the NSR catalyst belongs to the specified NSR temperature range but the temperature of the SCR catalyst does not belong to the specified SCR temperature range, $NO_x$ reduction treatment in the NSR catalyst may be performed using only the fuel supply with the fuel supply means. Specifically, the fuel supply adjusts the air-fuel ratio of the exhaust gas flowing into the NSR catalyst to be a rich air-fuel ratio suitable for reduction of occluded $NO_x$. In the case where the temperature of the SCR catalyst belongs to the specified SCR temperature range but the temperature of the NSR catalyst does not belong to the specified NSR temperature range, $NO_x$ reduction treatment may be performed not by fuel supply with the fuel supply means but by addition of an additive with the addition means.

In the exhaust gas control system for an internal combustion engine described so far, the exhaust gas containing a relatively large quantity of oxygen flows into the SCR catalyst when fuel supply is stopped in the second air-fuel ratio processing so as to adjust the air-fuel ratio of the exhaust gas flowing into the NSR catalyst to be the second lean air-fuel ratio. In such a case, recovery of the ion valence of the reducing metal element in the SCR catalyst by the second air-fuel ratio processing may be implemented relatively swiftly. Accordingly, in such a case, the reduction control means may stop the second air-fuel ratio processing and switch to the first air-fuel ratio processing, when the air-fuel ratio of the exhaust gas flowing out of the NSR catalyst in the second air-fuel ratio processing becomes the second lean air-fuel ratio or air-fuel ratios in the vicinity of the second lean air-fuel ratio (hereinafter referred to as "air-fuel ratios such as the second lean air-fuel ratio). Once the second air-fuel ratio processing is started and the air-fuel ratio of the exhaust gas flowing out of the NSR catalyst becomes air-fuel ratios such as the second lean air-fuel ratio in this way, it is considered that a required quantity of oxygen is soon supplied to the SCR catalyst positioned on the downstream side. Accordingly, the timing at which the air-fuel ratio of the exhaust gas flowing out of the NSR catalyst becomes air-fuel ratios such as the second lean air-fuel ratio after the second air-fuel ratio processing is started can be adopted as rational timing of stopping the second air-fuel ratio processing and switching to the first air-fuel ratio processing.

In the exhaust gas control system for an internal combustion engine described so far, the reduction control means may switch the first air-fuel ratio processing to the second air-fuel ratio processing and then continue the second air-fuel ratio processing for a predetermined period, when a $NO_x$ purification rate by the SCR catalyst becomes less than a specified purification rate threshold value during the first air-fuel ratio processing in the specified air-fuel ratio processing. As described in the foregoing, when the first air-fuel ratio processing is performed in the specified air-fuel ratio processing, the ion valence of the reducing metal element in the SCR catalyst on the downstream side may change to the state unsuitable for $NO_x$ reduction as time lapses. As a result, the $NO_x$ purification rate of the SCR catalyst deteriorates. Accordingly, when the $NO_x$ purification rate becomes less than the specified purification rate threshold value, it can be rationally determined that the ion valence of the reducing metal element in the SCR catalyst should be recovered at that timing. At the timing when the $NO_x$ purification rate becomes less than the specified purification rate threshold value, the first air-fuel ratio processing is switched to the second air-fuel ratio processing so as to recover the ion valence of the reducing metal element in the SCR catalyst. When the second air-fuel ratio processing is performed, the exhaust gas containing a larger quantity of oxygen is fed to the SCR catalyst. Accordingly, the second air-fuel ratio processing continues for a predetermined period that is a period required to recover the ion valence of the reducing metal element in the SCR catalyst, and then the processing is stopped. When the second air-fuel ratio processing is stopped, the first air-fuel ratio processing is performed again.

According to the present disclosure, in the exhaust gas control system having an NSR catalyst and an SCR catalyst disposed in order from the upstream side in an exhaust passage of an internal combustion engine, adequate use of both the catalysts can be achieved to enhance the $NO_x$ purification capacity as a system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 illustrates transition of parameters relating to $NO_x$ reduction when the SCR-based air-fuel ratio processing illustrated in FIG. 6 is executed.

DETAILED DESCRIPTION OF EMBODIMENTS

A specific mode of implementing the present disclosure will be described hereinbelow with reference to the accompanying drawings. Note that sizes, materials, shapes, and relative arrangements of component members disclosed in an embodiment are not intended to restrict the technical scope of the present disclosure thereto unless otherwise specified.

Figure 1:
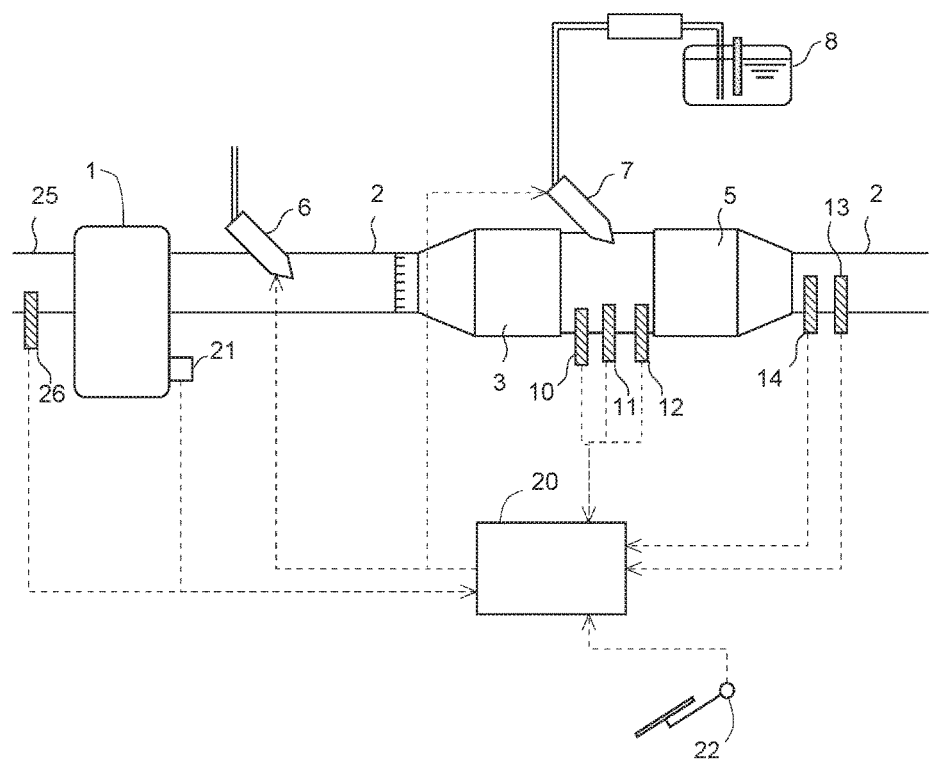
FIG. 1 illustrates a schematic configuration of an exhaust gas control system for an internal combustion engine according to the present disclosure.

The embodiment of the exhaust gas control system for an internal combustion engine according to the present disclosure will be described with reference to the drawings attached to the specification of the present application. FIG. 1 illustrates a schematic configuration of an exhaust gas control system for an internal combustion engine 1 according to the present embodiment. The internal combustion engine 1 is a diesel engine for driving a vehicle.

The internal combustion engine 1 is connected to an exhaust passage 2. The exhaust passage 2 is equipped with an SCR catalyst 5 that is a selective reduction type $NO_x$ catalyst configured to selectively reduce $NO_x$ in exhaust gas with ammonia as a reducing agent. The SCR catalyst 5 is configured such that copper Cu that is a reducing metal element is ion-exchanged and thereby carried on zeolite used as a base material. In order to generate ammonia that acts as a reducing agent in the SCR catalyst 5, urea water that is a precursor of ammonia stored in a urea tank 8 is added to exhaust gas as an additive according to the present disclosure, with an addition valve 7 positioned on the upstream side of the SCR catalyst 5. The urea water added from the addition valve 7 is hydrolyzed with the heat of the exhaust gas to generate ammonia, and the generated ammonia is adsorbed onto the SCR catalyst 5. The ammonia causes a reduction reaction with $NO_x$ in the exhaust gas, which results in purification of $NO_x$. The addition of urea water with the addition valve 7 corresponds to the processing with the addition means according to the present disclosure. Although the urea water is added from the addition valve 7 in the present embodiment as described above, ammonia or aqueous ammonia may directly be added to the exhaust gas instead.

Provided on the downstream side of the SCR catalyst 5 is an oxidation catalyst (hereinafter referred to as "ASC catalyst") for oxidizing ammonia that slips through the SCR catalyst 5. In FIG. 1, the ASC catalyst is omitted. The ASC catalyst may be a catalyst configured from a combination of an oxidation catalyst and an SCR catalyst that reduces $NO_x$ in exhaust gas with ammonia as a reducing agent. In that case, for example, the oxidation catalyst may be formed from a noble metal such as platinum Pt that is carried on a carrier made of a material such as aluminum oxide $Al_2O_3$ and zeolite. The SCR catalyst may be formed from a material, such as copper Cu and iron Fe, that is carried on a carrier made of zeolite. When the ASC catalyst is formed as a catalyst having such configuration, HC, CO, and ammonia in exhaust gas can be oxidized. Furthermore, ammonia can partially be oxidized to generate $NO_x$, and the generated $NO_x$ can also be reduced with excessive ammonia.

The exhaust passage 2 is further equipped with an NSR catalyst 3 that is a NOx storage reduction catalyst provided on the upstream side of the SCR catalyst 5 and the addition valve 7. The NSR catalyst 3 has an occlusion agent that occludes $NO_x$. When an inflow of exhaust gas has a high oxygen concentration, the NSR catalyst 3 occludes $NO_x$ in the exhaust gas. When the inflow of exhaust gas has a low oxygen concentration and a reducing agent such as the fuel of the internal combustion engine 1 is present, the NSR catalyst 3 emits and reduces the occluded $NO_x$. In the present embodiment, the reducing agent used in the NSR catalyst 3 is the fuel of the internal combustion engine 1 supplied by a fuel supply valve 6 provided on the upstream side of the NSR catalyst 3. The fuel supplied by the fuel supply valve 6 flows into the NSR catalyst 3 together with the exhaust gas, and acts as a reducing agent therein. Since fuel supply by the fuel supply valve 6 also controls the air-fuel ratio of the exhaust gas flowing into the NSR catalyst 3, the fuel supply corresponds to the processing by the fuel supply means of the present disclosure. In the present embodiment, the fuel supply is performed by the fuel supply valve 6 as the fuel supply means. However, instead of the fuel supply, adjustment of fuel injection conditions (such as fuel injection quantity and fuel injection timing) in the internal combustion engine 1 may be performed in order to control the fuel included in the exhaust gas discharged from the internal combustion engine 1.

Provided on the downstream side of the NSR catalyst 3 and on the upstream side of the SCR catalyst 5 are an air-fuel ratio sensor 10 that detects the air-fuel ratio of the exhaust gas flowing out of the NSR catalyst 3, a $NO_x$ sensor 11 that detects $NO_x$ concentration in the exhaust gas, and a temperature sensor 12 that detects temperature of the exhaust gas. Provided on the downstream side of the SCR catalyst 5 are a $NO_x$ sensor 13 that detects $NO_x$ concentration in the exhaust gas flowing out of the SCR catalyst 5, and a temperature sensor 14 that detects temperature of the exhaust gas. The exhaust gas control system of the internal combustion engine 1 is annexed with an electronic control unit (ECU) 20. The ECU 20 is a unit that controls an operating state of the internal combustion engine 1, the exhaust gas control system, and the like. The ECU 20 is electrically connected to the air fuel ratio sensor 10, the $NO_x$ sensors 11, 13, and the temperature sensors 12, 14, described before. The ECU 20 is also electrically connected to other sensors such as a crank position sensor 21, an accelerator opening sensor 22 and an air flowmeter 26 installed in an intake passage 25 of the internal combustion engine 1. Detection values of the respective sensors are delivered to the ECU 20. Therefore, the ECU 20 can grasp parameters relating to the operating state of the internal combustion engine 1, such as an intake air quantity based on the detection value of the air flowmeter 26, an exhaust gas flow rate calculated based on the intake air quantity, an engine speed based on the detection value of the crank position sensor 21, and engine load based on the detection value of the accelerator opening sensor 22. The ECU 20 can estimate catalyst temperature of the NSR catalyst 3 based on the detection value of the temperature sensor 12, and can also estimate temperature of the SCR catalyst 5 based on the detection value of the temperature sensor 14.

The $NO_x$ concentration in the exhaust gas flowing into the NSR catalyst 3 corresponds to the $NO_x$ concentration of the exhaust gas discharged from the internal combustion engine 1. Accordingly, in the present embodiment, the ECU 20 can estimate the $NO_x$ concentration in the exhaust gas flowing into the NSR catalyst 3 based on the operating state of the internal combustion engine 1. Furthermore, the exhaust gas flows into the NSR catalyst 3, and $NO_x$ in the exhaust gas is occluded in the NSR catalyst 3. Accordingly, the ECU 20 can estimate the quantity of $NO_x$ ($NO_x$ occlusion quantity) occluded in the NSR catalyst 3 based on the $NO_x$ concentration in the exhaust gas flowing into the NSR catalyst 3 and on the exhaust gas flow rate. The exhaust gas flow rate is calculated based on parameters such as the intake flow rate detected with the air flowmeter 26 and the fuel injection quantity in the internal combustion engine 1.

As for the SCR catalyst 5, the ECU 20 gives an instruction to the addition valve 7 in accordance with the $NO_x$ concentration (i.e., the detection value of the $NO_x$ sensor 11) in the exhaust gas flowing into the SCR catalyst 5 so as to supply to the exhaust gas the quantity of the urea water required for reduction and purification of $NO_x$. For example, based on the estimated quantity of ammonia adsorbed onto the SCR catalyst 5, the quantity of urea water added from the addition valve 7 may be determined. Since the ammonia adsorption quantity in the SCR catalyst 5 can be estimated by conventional technology, the detailed description thereof is omitted in this specification. Alternatively, urea water addition from the addition valve 7 may be controlled such that the $NO_x$ purification rate of the SCR catalyst 5 determined by the following expression 1 falls within a specified range preferable in a viewpoint of exhaust gas purification. Further alternatively, urea water addition from the addition valve 7 may be controlled based on a difference between the detection values of $NO_x$ sensors 11, 13 disposed on the upstream side and the downstream side of the SCR catalyst 5, respectively.

$NO_x$ purification rate=1−(detection value of $NO_x$ sensor 13)/(detection value of $NO_x$ sensor 11)  (Expression 1)

Here, the $NO_x$ purification capacity of each of the NSR catalyst 3 and the SCR catalyst 5 included in the exhaust gas control system of the internal combustion engine 1 illustrated in FIG. 1 is described with reference to FIGS. 2A and 2B. The $NO_x$ purification capacity of the NSR catalyst 3 represents a sum total of the reduction quantity of the occluded $NO_x$ per unit time and the quantity of $NO_x$ occluded in the NSR catalyst 3 per unit time, the $NO_x$ purification capacity being demonstrated when a necessary and sufficient quantity of the reducing agent (fuel) is supplied. Therefore, the $NO_x$ purification capacity of the NSR catalyst 3 can be demonstrated even when the catalyst temperature is in a temperature range where the occluded $NO_x$ cannot be reduced. The $NO_x$ purification capacity of the SCR catalyst 5 represents a selective reduction quantity of $NO_x$ per unit time, the $NO_x$ purification capacity being demonstrated when a necessary and sufficient quantity of the reducing agent (ammonia) is supplied. Therefore, the $NO_x$ purification capacity of the SCR catalyst 5 can be identified as the $NO_x$ reduction capacity of the SCR catalyst 5.

Figure 2A:
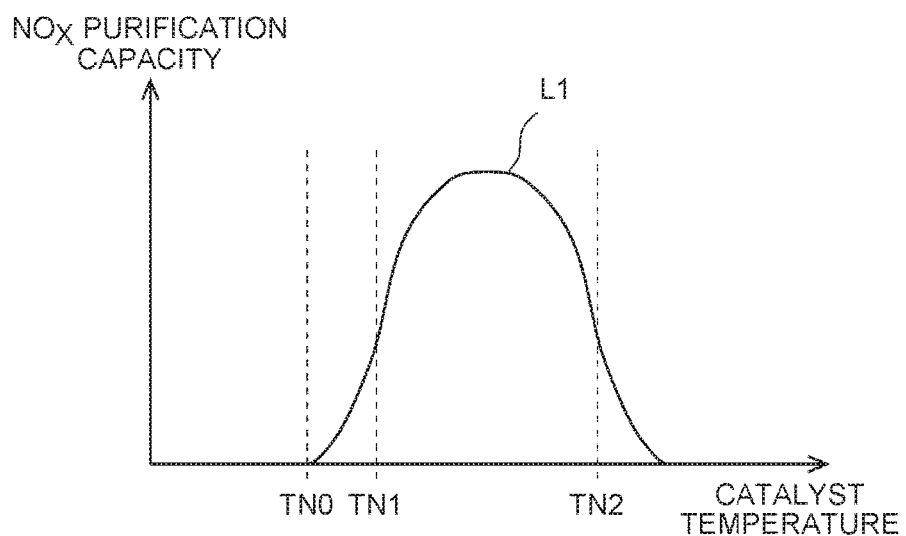
FIG. 2A illustrates correlation between catalyst temperature and $NO_x$ purification capacity in the NSR catalyst provided in the exhaust gas control system for an internal combustion engine illustrated in FIG. 1.
Figure 2B:
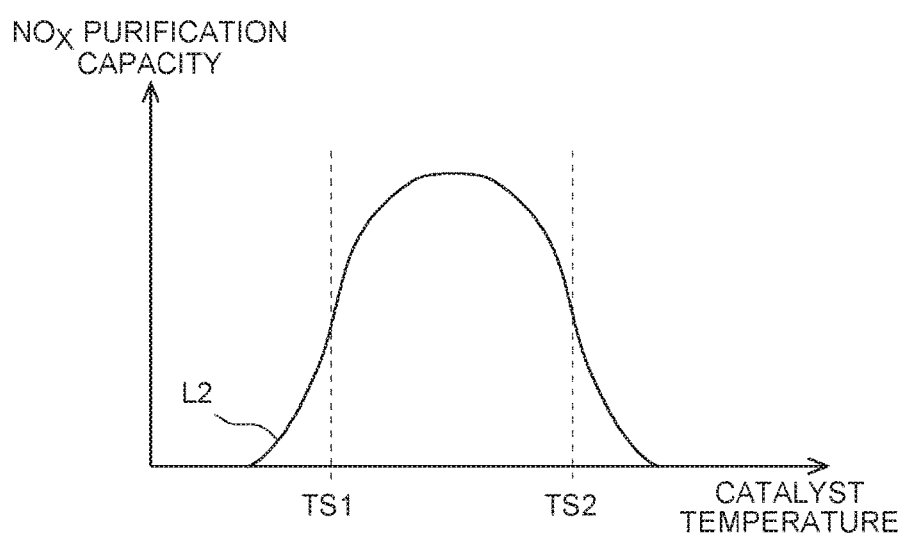
FIG. 2B illustrates correlation between catalyst temperature and $NO_x$ purification capacity in the SCR catalyst provided in the exhaust gas control system for an internal combustion engine illustrated in FIG. 1.

Here, FIG. 2A illustrates correlation between the catalyst temperature and the $NO_x$ purification capacity of the NSR catalyst 3 with a line L1. FIG. 2B illustrates correlation between the catalyst temperature and the $NO_x$ purification capacity of the SCR catalyst 5 with a line L2. In the NSR catalyst 3, when the catalyst temperature belongs to the range of TN1 to TN2 (TN2>TN1), the occluded $NO_x$ can be reduced with the fuel supplied from the fuel supply valve 6 as a reducing agent, and so the $NO_x$ purification capacity of the NSR catalyst 3 may adequately be demonstrated. Therefore, the temperature range (temperature range of TN1 to TN2) corresponds to the specified NSR temperature range according to the present disclosure. In the case where the temperature of the NSR catalyst 3 is lower than TN1 and is equal to or more than TN0 (TN0<TN1), it is difficult for the NSR catalyst 3 to reduce $NO_x$. However, since $NO_x$ in the exhaust gas is occluded in the NSR catalyst 3, the $NO_x$ purification capacity is demonstrated to some extent as a result.

In the SCR catalyst 5, when the catalyst temperature belongs to the range of TS1 to TS2 (TS2>TS1), $NO_x$ can be reduced with ammonia generated from urea water added from the addition valve 7 as a reducing agent, and so the $NO_x$ purification capacity of the SCR catalyst 5 may adequately be demonstrated. Therefore, the temperature range (temperature range of TS1 to TS2) corresponds to the specified SCR temperature range according to the present disclosure.

The respective catalysts are designed such that the $NO_x$ purification capacity by the SCR catalyst 5 as an individual element is demonstrated at lower temperatures than the $NO_x$ purification capacity by the NSR catalyst 3 as an individual element. This is because a consideration is given to the fact that in the exhaust gas control system, the SCR catalyst 5 is disposed downstream from the NSR catalyst 3, and therefore the temperature of the SCR catalyst 5 tends to be lower than the temperature of the NSR catalyst 3 at the same timing. Since the SCR catalyst 5 is designed to be able to demonstrate the $NO_x$ reduction capacity while the catalyst temperature is relatively low, the $NO_x$ purification capacity of the exhaust gas control system can be enhanced.

In the exhaust gas control system, fuel supply from the fuel supply valve 6 and urea water addition from the addition valve 7 are performed such that $NO_x$ reduction by the respective NSR catalyst 3 and the SCR catalyst 5 is performed in accordance with the catalyst temperature of the respective catalysts. For example, when $NO_x$ reduction is performed only by the NSR catalyst 3 since the catalyst temperature of the NSR catalyst 3 belongs to the specified NSR temperature range, but the temperature of the SCR catalyst 5 does not belong to the specified SCR temperature range, or when $NO_x$ reduction is performed only by the SCR catalyst 5 since the catalyst temperature of the NSR catalyst 3 does not belong to the specified NSR temperature range, but the temperature of the SCR catalyst 5 belongs to the specified SCR temperature range, $NO_x$ reduction is performed by only one catalyst.

Figure 3:
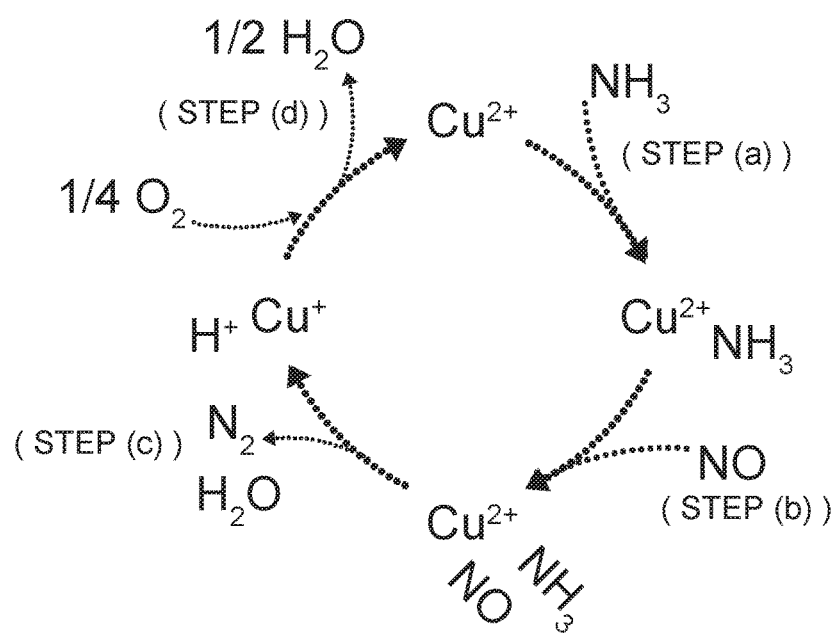
FIG. 3 is a model diagram for illustrating a $NO_x$ reduction reaction in the SCR catalyst.

When the catalyst temperature of the NSR catalyst 3 belongs to the specified NSR temperature range and the catalyst temperature of the SCR catalyst 5 belongs to the specified SCR temperature range, $NO_x$ reduction can be performed by both the catalysts. Here, the $NO_x$ reduction reaction in the SCR catalyst 5 is described with reference to FIG. 3. FIG. 3 schematically illustrates the $NO_x$ reduction reaction for the purpose of description. The $NO_x$ reduction reaction in the SCR catalyst 5 occurs on the reducing metal element Cu carried in zeolite. The $NO_x$ reduction reaction is considered to be schematically divided into four steps (a) to (d). First, in step (a), ammonia ($NH_3$) is adsorbed onto a copper ion having a valence of 2+. In step (b), $NO_x$ (NO) is further adsorbed onto the copper ion. As a result, in step (c), a reduction reaction of NO takes place so that nitrogen ($N_2$) and water ($H_2O$) are generated, while the valence of the copper ion changes to 1+. At this time, hydrogen ion $H^+$ is adsorbed onto the copper ion $Cu^+$. When oxygen ($\frac{1}{4}O_2$) is supplied to the copper ion $Cu^+$ in this state in step (d), water ($\frac{1}{2}H_2O$) is generated, while the valence of the copper ion is recovered to 2+. Accordingly, the reaction from step (a) can sequentially be continued again, so that continuous $NO_x$ reduction by the SCR catalyst 5 can be achieved. Thus, in the SCR catalyst 5, in order to implement continuous $NO_x$ reduction, it is considered that the valence of the copper ion needs to be recovered ($Cu^+ \rightarrow Cu^{2+}$) in step (d). However, if it is attempted to make the NSR catalyst 3 reduce the occluded $NO_x$ by adjusting the air-fuel ratio of the exhaust gas flowing into the NSR catalyst 3 to be a rich air-fuel ratio when both the catalysts are used for $NO_x$ reduction, $NO_x$ ends up flowing out to the downstream side, and the SCR catalyst 5 is exposed to stoichiometric or rich atmosphere. As a result, oxygen supply becomes insufficient in step (d), which hinders valence recovery ($Cu^+ \rightarrow Cu^{2+}$) of the copper ion as a reducing metal element in the SCR catalyst 5. This makes it difficult for the SCR catalyst 5 to implement continuous $NO_x$ reduction. Accordingly, when both the catalysts can reduce $NO_x$ in this way, it is necessary to form the $NO_x$ purification capacity of the entire exhaust gas control system with due consideration to catalytic characteristics of the SCR catalyst 5 in particular.

Figure 4:
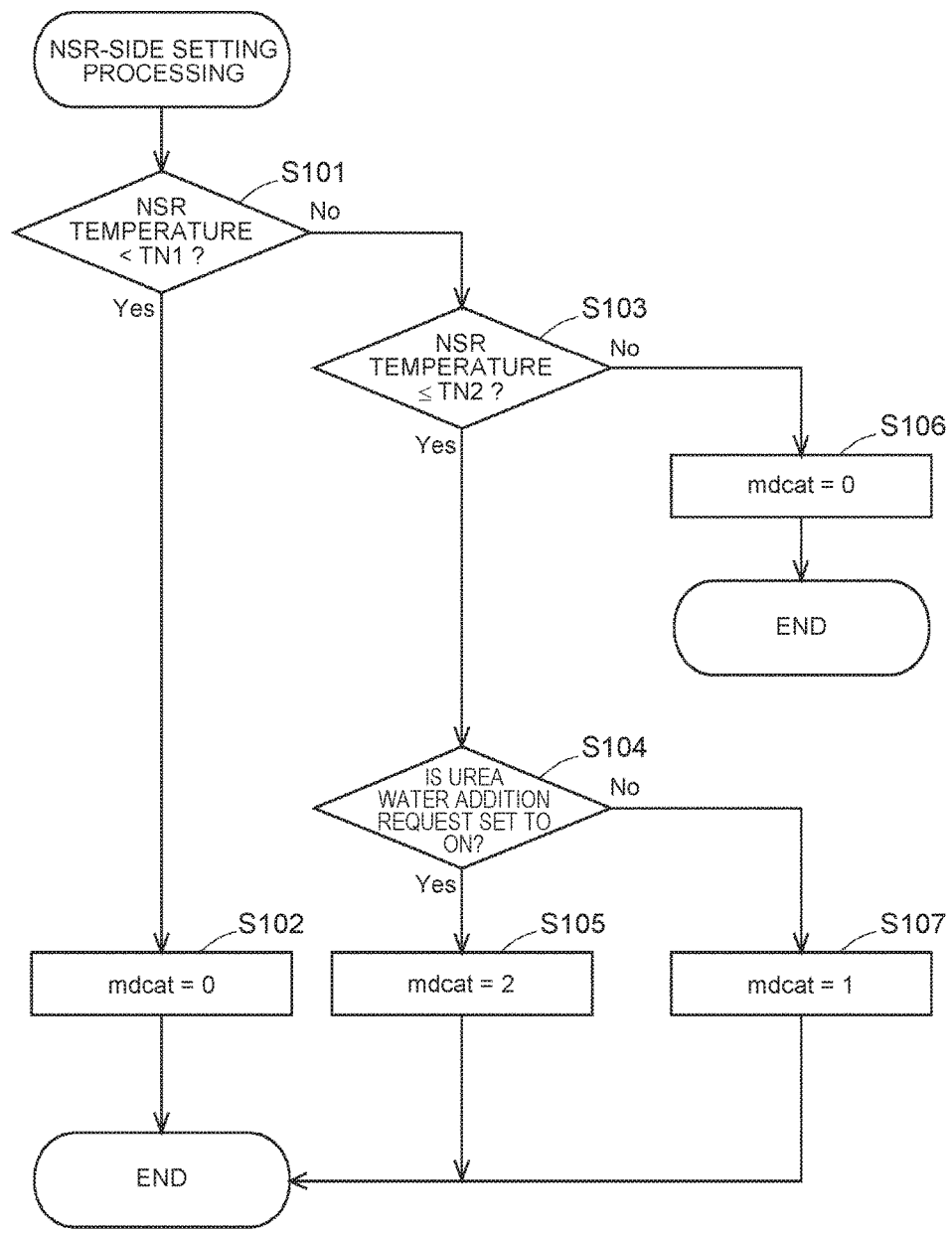
FIG. 4 is a flowchart of first NSR-side setting processing for determining air-fuel ratio processing performed in the exhaust gas control system for an internal combustion engine illustrated in FIG. 1.
Figure 5:
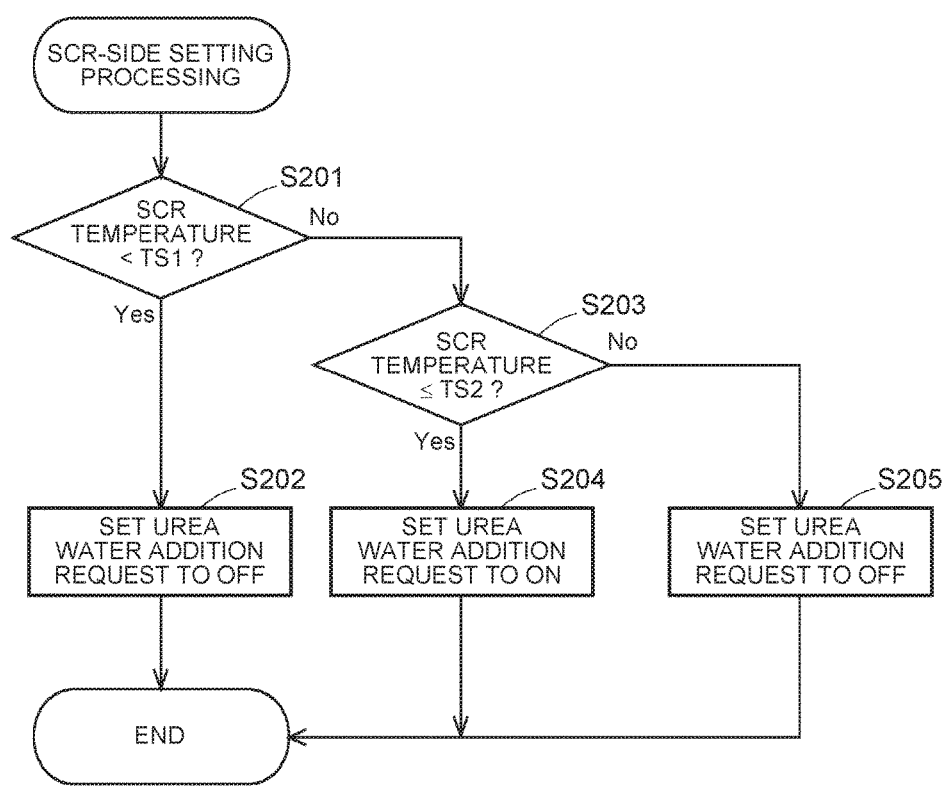
FIG. 5 is a flowchart of SCR-side setting processing for determining ammonia supply to the SCR catalyst provided in the exhaust gas control system for an internal combustion engine illustrated in FIG. 1.
Figure 6:
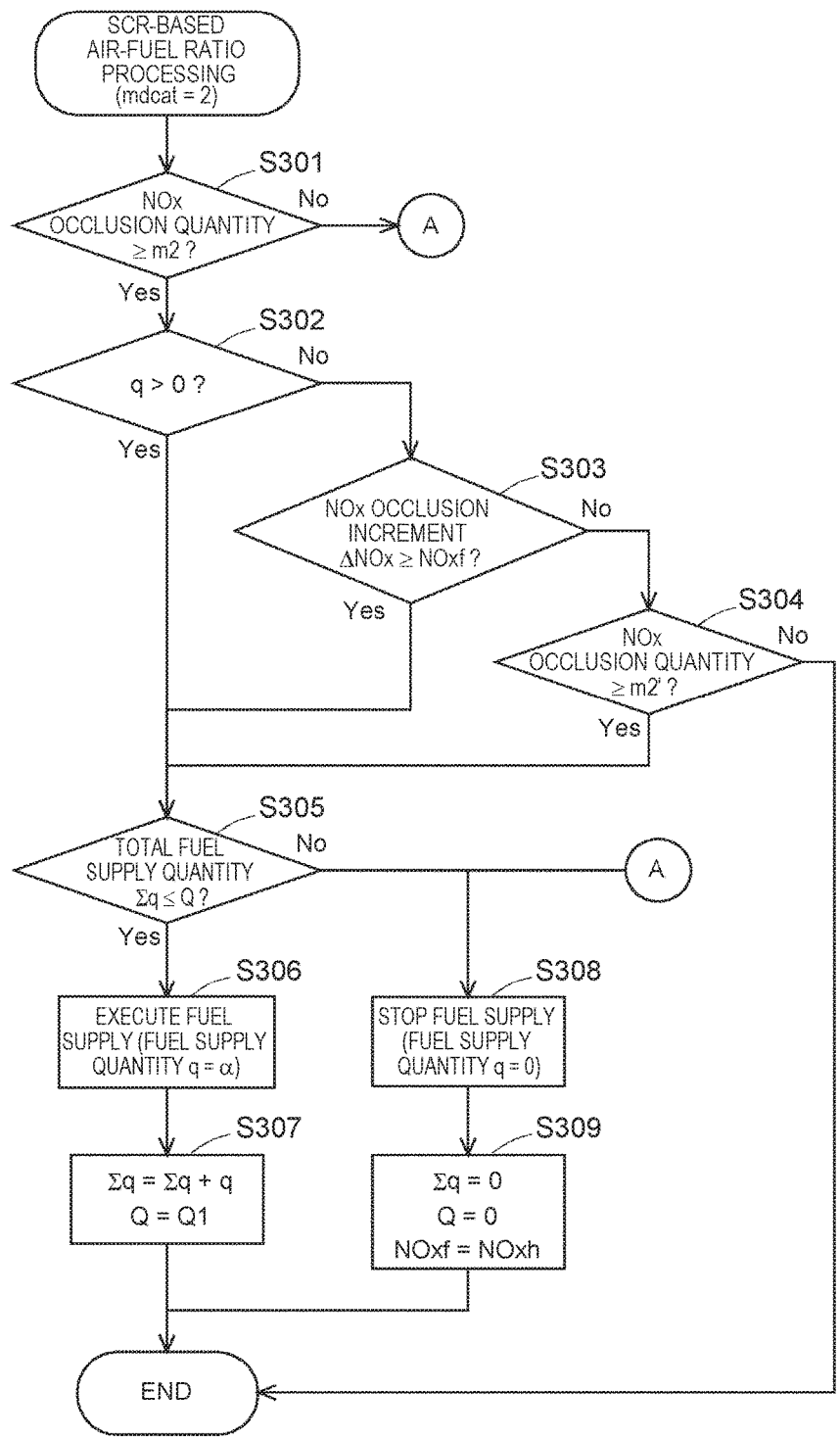
FIG. 6 is a flowchart of SCR-based air-fuel ratio processing performed in the exhaust gas control system for an internal combustion engine illustrated in FIG. 1.

Based on the above, the processing relating to the $NO_x$ reduction in the exhaust gas control system will be described with reference to FIGS. 4 to 6. FIG. 4 is a flowchart of NSR-side setting processing for determining air-fuel ratio processing of the exhaust gas flowing into the NSR catalyst 3 at the time of performing $NO_x$ reduction by the NSR catalyst 3. A parameter mdcat determined in the NSR-side setting processing is used to control the mode of fuel supply to the NSR catalyst 3 from the fuel supply valve 6. FIG. 5 is a flowchart of SCR-side setting processing for determining a urea water addition request from the addition valve 7 for execution of $NO_x$ reduction by the SCR catalyst 5. When the urea water addition request determined in the SCR-side setting processing is set to ON, it signifies that urea water addition from the addition valve 7 is requested. FIG. 6 is a flowchart of SCR-based air-fuel ratio processing that is air-fuel ratio processing involving fuel supply from the fuel supply valve 6, the SCR-based air-fuel ratio processing being executed when the parameter mdcat is set to "2" in the NSR-side setting processing. Each processing illustrated in FIGS. 4, to 6 is repeatedly and independently executed at specified intervals based on control programs stored in the ECU 20.

First, the NSR-side setting processing will be described with reference to FIG. 4. In S101, it is determined whether or not the catalyst temperature of the NSR catalyst 3 is lower than a temperature TN1 that is a lower limit of the specified NSR temperature range illustrated in FIG. 2A. When positive determination is made in S101, it signifies that the catalyst temperature of the NSR catalyst 3 is out of the specified NSR temperature range. As a consequence, the processing proceeds to S102. In S102, the parameter mdcat is set to a value "0". When negative determination is made in S101, the processing proceeds to S103. In S103, it is determined whether or not the catalyst temperature of the NSR catalyst 3 is equal to or less than a temperature TN2 that is an upper limit of the specified NSR temperature range. When negative determination is made in S103, it also signifies that the catalyst temperature of the NSR catalyst 3 is out of the specified NSR temperature range. As a consequence, the processing proceeds to S106. In S106, the parameter mdcat is set to a value "0".

Here, when positive determination is made in S103, it signifies that the catalyst temperature of the NSR catalyst 3 belongs to the specified NSR temperature range. Accordingly, when positive determination is made in S103, the processing proceeds to S104. In S104, it is determined whether or not the urea addition request is set to ON. Specific setting processing of the urea addition request will be described later with reference to FIG. 5. When the urea addition request is set to ON, it signifies that addition of urea water from the addition valve 7 is requested for execution of $NO_x$ reduction by the SCR catalyst 5. When the urea addition request is not set to ON, that is, when the urea addition request is set to OFF, it signifies that the urea water addition from the addition valve 7 is not requested. When positive determination is made in S104, it signifies that in the situation where $NO_x$ reduction is performed by the SCR catalyst 5, the situation is formed where $NO_x$ reduction can also be performed by the NSR catalyst 3. In such a case, in the processing of S105, the parameter mdcat is set to a value "2". When negative determination is made in S104, it signifies that in the situation where $NO_x$ reduction is not performed by the SCR catalyst 5, the situation is formed where $NO_x$ reduction can be performed by the NSR catalyst 3 through fuel supply from the fuel supply valve 6. In such a case, in the processing of S107, the parameter mdcat is set to a value "1".

Next, the SCR-side setting processing will be described with reference to FIG. 5. In S201, it is determined whether or not the catalyst temperature of the SCR catalyst 5 is lower than a temperature TS1 that is a lower limit of the specified SCR temperature range illustrated in FIG. 2B. When positive determination is made in S201, it signifies that the catalyst temperature of the SCR catalyst 5 is out of the specified SCR temperature range. As a consequence, the processing proceeds to S202. In S202, the urea water addition request is set to OFF. When negative determination is made in S201, the processing proceeds to S203. In S203, it is determined whether or not the catalyst temperature of the SCR catalyst 5 is equal to or less than a temperature TS2 that is an upper limit of the specified SCR temperature range. When negative determination is made in S203, it also signifies that the catalyst temperature of the SCR catalyst 5 is out of the specified SCR temperature range. As a consequence, the processing proceeds to S205. In S205, the urea water addition request is set to OFF.

Here, when positive determination is made in S203, it signifies that the catalyst temperature of the SCR catalyst 5 belongs to the specified SCR temperature range. Accordingly, when positive determination is made in S203, the processing proceeds to S204. In S204, the urea water addition request is set to ON.

According to the NSR-side setting processing and the SCR-side setting processing described before, when the catalyst temperature of the SCR catalyst 5 belongs to the specified SCR temperature range, the urea water addition request is set to ON and thereby addition of urea water to the SCR catalyst 5 is executed from the addition valve 7. In the urea water addition processing, the quantity of urea water to be added may be controlled such that the ammonia adsorption quantity in the SCR catalyst 5 becomes a specified quantity or be controlled based on a parameter such as the $NO_x$ purification rate of the SCR catalyst 5 and a difference between the detection values of the $NO_x$ sensors 11, 13.

For the NSR catalyst 3, processing (simply referred to as "air-fuel ratio processing" below) relating to the air-fuel ratio of the exhaust gas flowing into the NSR catalyst 3 through fuel supply from the fuel supply valve 6 is executed in accordance with the value of the set parameter mdcat. Specifically, when the value "0" is set for the parameter mdcat, the catalyst temperature of the NSR catalyst 3 does not belong to the specified NSR temperature range. Accordingly, fuel supply from the fuel supply valve 6 is not performed. As a result, $NO_x$ reduction by the NSR catalyst 3 is not performed. At this time, when the catalyst temperature of the NSR catalyst 3 is equal to or more than temperature TN0 illustrated in FIG. 2A, occlusion of $NO_x$ by the NSR catalyst 3 is performed. Next, when the value "1" is set for the parameter mdcat, $NO_x$ reduction by the NSR catalyst 3 is performed under the situation where $NO_x$ reduction is not performed in the SCR catalyst 5. Accordingly, when $NO_x$ reduction is performed in the NSR catalyst 3, it is not necessary to take into consideration the conditions for $NO_x$ reduction in the SCR catalyst 5. Accordingly, in the air-fuel ratio processing when the parameter mdcat is "1", the air-fuel ratio of the exhaust gas flowing into the NSR catalyst 3 is a specified rich air-fuel ratio richer than the theoretical air fuel ratio. Consequently, the $NO_x$ occluded in the NSR catalyst 3 is emitted, and the emitted $NO_x$ is reduced with a fuel component in the exhaust gas as a reducing agent. The air-fuel ratio processing when the parameter mdcat is "1" may be performed when $NO_x$ occlusion quantity in the NSR catalyst 3 exceeds a specified quantity. That is, the air-fuel ratio processing is performed when the $NO_x$ occlusion quantity is increased to the level that the NSR catalyst 3 needs to secure the capacity that allows $NO_x$ occlusion. This makes it possible to keep execution frequency of the air-fuel ratio processing low and to suppress the consumption of fuel necessary for executing the air-fuel ratio processing.

When the parameter mdcat is set to a value "2", $NO_x$ reduction by the NSR catalyst 3 is executable under the situation where $NO_x$ reduction is performed in the SCR catalyst 5. If reduction of occluded $NO_x$ is performed in the NSR catalyst 3 as in the case where the parameter mdcat is "1", fuel supply is performed from the fuel supply valve 6 to adjust the air-fuel ratio of the exhaust gas flowing into the NSR catalyst 3 to be the specified rich air-fuel ratio that is necessary for emitting the occluded $NO_x$ and reducing the emitted $NO_x$. Accordingly, the SCR catalyst 5 is also exposed to stoichiometric or rich atmosphere in that case.

Here, the reduction reaction of $NO_x$ in the SCR catalyst 5 is as illustrated in FIG. 3. The reduction reaction can be expressed by a following equation.

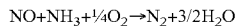

$$NO + NH_3 + \tfrac{1}{4}O_2 \rightarrow N_2 + 3/2 H_2O$$

As described in the foregoing, in the SCR catalyst 5, the continuous reduction reaction of $NO_x$ becomes possible only after a required quantity of oxygen is contained in the exhaust gas flowing into the SCR catalyst 5. Accordingly, when the air-fuel ratio of the exhaust gas flowing into the NSR catalyst 3 is adjusted to be the specified rich air-fuel ratio as in the case where the parameter mdcat is "1", and $NO_x$ reduction by the NSR catalyst 3 is performed in this state, it becomes difficult to implement effective $NO_x$ reduction by the SCR catalyst 5.

Accordingly, based on such characteristics of the SCR catalyst 5, the SCR-based air-fuel ratio processing illustrated in FIG. 6 is executed in the exhaust gas control system of the internal combustion engine 1 in the present embodiment. The SCR-based air-fuel ratio processing corresponds to the specified air-fuel ratio processing of the present disclosure. The SCR-based air-fuel ratio processing is the exhaust gas air-fuel ratio processing for mainly performing $NO_x$ reduction by the SCR catalyst 5, in which $NO_x$ reduction by the NSR catalyst 3 is substantially not performed even if the $NO_x$ reduction by the NSR catalyst 3 is executable under the situation where $NO_x$ reduction is performed by the SCR catalyst 5. This is based on the fact that relatively efficient $NO_x$ reduction can be implemented when the catalyst temperature of the SCR catalyst 5 belongs to the specified SCR temperature range. Furthermore, in the $NO_x$ reduction by the NSR catalyst 3, a fuel component may flow out of the system since the air-fuel ratio of the exhaust gas is adjusted to the specified rich air-fuel ratio. However, when the SCR catalyst 5-based $NO_x$ reduction is executed, the quantity of fuel supply to the exhaust gas can be reduced. Therefore, such outflow of the fuel component can be suppressed.

When $NO_x$ reduction by the SCR catalyst 5 is performed, it is preferable that the air-fuel ratio of the exhaust gas flowing into the SCR catalyst 5 be a lean air-fuel ratio (air-fuel ratio leaner than the theoretical air fuel ratio) where oxygen content is high enough to allow continuous recovery of the valence of the copper ion in the SCR catalyst 5. In that case, the $NO_x$ occlusion quantity in the NSR catalyst 3 disposed on the upstream side of the SCR catalyst 5 may increase. If increase in engine load of the internal combustion engine 1 or the like may occur while $NO_x$ occlusion in the NSR catalyst 3 is in such a state, the occluded $NO_x$ may possibly be emitted from the NSR catalyst 3 at a speed rapid enough to hinder reduction treatment in the SCR catalyst 5. Accordingly, in the SCR-based air-fuel ratio processing, in order to enable the SCR catalyst 5 to perform continuous $NO_x$ reduction, processing to control the $NO_x$ occlusion quantity in the NSR catalyst 3 is performed.

FIG. 7 illustrates transition of various parameters relating to $NO_x$ reduction when the SCR-based air-fuel ratio processing is executed. Specifically, FIG. 7 illustrates transition of each parameter including an air-fuel ratio of the exhaust gas flowing into the NSR catalyst 3 (transition illustrated with a solid line L3), an air-fuel ratio of the exhaust gas flowing out of the NSR catalyst 3 (transition illustrated with a broken line L4), a $NO_x$ occlusion quantity in the NSR catalyst 3, an increment $\Delta NO_x$ of $NO_x$ occlusion quantity (referred to as "$NO_x$ occlusion increment" below), a total fuel supply quantity $\Sigma q$, $NO_x$ concentration in the downstream of the NSR catalyst 3, and $NO_x$ concentration in the downstream of the SCR catalyst 5.

The various parameters are defined as follows. The $NO_x$ occlusion increment $\Delta NO_x$ is a parameter representing an increment width of the $NO_x$ occlusion quantity incremented when $NO_x$ is occluded in the NSR catalyst 3 while fuel supply from the fuel supply valve 6 is not in operation. A reference time point (timing used as a reference for calculating the increment width) of the $NO_x$ occlusion increment $\Delta NO_x$ is the last time when fuel supply from the fuel supply valve 6 is stopped. The $NO_x$ occlusion quantity in the NSR catalyst 3 is calculated in accordance with the quantity of $NO_x$ in the exhaust gas estimated based on the operating state of the internal combustion engine 1. The total fuel supply quantity $\Sigma q$ is the total quantity of fuel supplied from the fuel supply valve 6 at predetermined time. The predetermined time starts at the time point when the total fuel supply quantity $\Sigma q$ is reset in the SCR-based air-fuel ratio processing illustrated in FIG. 6. A value q is the quantity of fuel supplied from the fuel supply valve 6 per unit time. The parameters used in the SCR-based air-fuel ratio processing of FIG. 6 also include a parameter Q and a parameter $NO_xf$ which do not represent transition in FIG. 7. The parameter Q relates to a total quantity of fuel supplied from the fuel supply valve 6, the total quantity being the quantity necessary for emitting a target quantity of occluded $NO_x$ from the NSR catalyst 3. The parameter $NO_xf$ is a parameter for setting an upper limit of the $NO_x$ occlusion increment $\Delta NO_x$.

First, in S301, it is determined whether or not the $NO_x$ occlusion quantity in the NSR catalyst 3 is equal to or more than a lower limit threshold m2 that is a lower limit of $NO_x$ occlusion quantity for suppressing the quantity of fuel slipping through the NSR catalyst 3 and flowing to the downstream side in S306 described later in the first air-fuel ratio processing. When positive determination is made in S301, the processing proceeds to S302. When negative determination is made, the processing proceeds to S308.

Next, in S302, it is determined whether or not the fuel supply quantity q per unit time is larger than zero, that is, whether or not fuel supply is performed from the fuel supply valve 6. When positive determination is made in S302, the processing proceeds to S305. When negative determination is made, the processing proceeds to S303. In S303, it is determined whether or not the $NO_x$ occlusion increment $\Delta NO_x$ is equal to or more than a set value of $NO_xf$. When positive determination is made in S303, the processing proceeds to S305. When negative determination is made, the processing proceeds to S304. In S304, it is determined whether or not the $NO_x$ occlusion quantity in the NSR catalyst 3 is equal to or more than an upper limit threshold m2' that is a substantial upper limit of the $NO_x$ occlusion quantity when the SCR-based air-fuel ratio processing is under execution. When positive determination is made in S304, the processing proceeds to S305. When negative determination is made, the SCR-based air-fuel ratio processing is ended.

Next, in S305, it is determined whether or not the total fuel supply quantity $\Sigma q$ is equal to or less than a set value of the parameter Q. Here, in the SCR-based air-fuel ratio processing, the value set as the parameter Q is either Q1 set in S307 described later or "0" set in S309 described later. These set values are used to determine whether or not an assumed quantity of the occluded $NO_x$ is emitted from the NSR catalyst 3 with respect to the total fuel supply quantity $\Sigma q$ from the fuel supply valve 6. The detail thereof will be described later. When positive determination is made in S305, the processing proceeds to S306. When negative determination is made, the processing proceeds to S308.

In S306, fuel supply from the fuel supply valve 6 is executed, and the fuel supply quantity q per unit time is set to $\alpha$. The fuel supply in S306 causes the air-fuel ratio of the exhaust gas flowing into the NSR catalyst 3 to be a first lean air-fuel ratio AFL1. The first lean air-fuel ratio AFL1 is an air-fuel ratio leaner than the theoretical air fuel ratio, the first lean air-fuel ratio AFL1 enabling the NSR catalyst 3 to emit occluded $NO_x$. For example, the first lean air-fuel ratio AFL1 is about 16. Therefore, the processing of S306 for forming the exhaust gas having the first lean air-fuel ratio AFL1 corresponds to the first air-fuel ratio processing of the present disclosure. Then, in S307 after the processing of S306, the fuel quantity supplied in S306 is integrated, so that the total fuel supply quantity $\Sigma q$ is updated, and the parameter Q is set to Q1. The value Q1 is the total supply quantity of fuel corresponding to the quantity of the occluded $NO_x$ assumed to be emitted from the NSR catalyst 3 in the first air-fuel ratio processing. After the processing of S307, the SCR-based air-fuel ratio processing is ended.

When the processing proceeds to S308 after negative determination is made in S305 or after negative determination is made in S301, fuel supply from the fuel supply valve 6 is stopped in S308. Therefore, the fuel supply quantity q per unit time in this case becomes "0". Since the fuel supply is stopped in S308, the air-fuel ratio of the exhaust gas flowing into the NSR catalyst 3 becomes a second lean air-fuel ratio AFL2 that is leaner than the first lean air-fuel ratio AFL1 formed in S306. Therefore, the processing of S308 for forming the exhaust gas having the second lean air-fuel ratio AFL2 corresponds to the second air-fuel ratio processing of the present disclosure. The second lean air-fuel ratio AFL2 is about 24, for example. Then, in S309 after the processing of S308, the total fuel supply quantity $\Sigma q$ is set to "0", the parameter Q is set to "0", and the parameter $NO_xf$ is set to $NO_xh$. The value $NO_xh$ is a target value of the $NO_x$ occlusion quantity which increments in the NSR catalyst 3 while the second air-fuel ratio processing is performed in S308, the value $NO_xh$ being a set value for at least securing a duration (predetermined period of the present disclosure) required for valence recovery of the copper ion in the SCR catalyst 5 in the second air-fuel ratio processing.

The $NO_x$ occlusion increment $\Delta NO_x$, the total fuel supply quantity $\Sigma q$, the fuel supply quantity q per unit time, and the parameters $NO_xf$ and Q are reset when the value of the parameter mdcat is changed by the NSR-side setting processing. Specifically, the $NO_x$ occlusion increment $\Delta NO_x$ is reset to "0", the total fuel supply quantity $\Sigma q$ is reset to "0", the fuel supply quantity q per unit time is reset to "0", the parameter $NO_xf$ is reset to "0", and the parameter Q is reset to "0". These parameters are also reset when the internal combustion engine 1 is started upon the ignition being turned on.

Here, the flow of the SCR-based air-fuel ratio processing illustrated in FIG. 6 is described based on transition of the parameters relating to $NO_x$ reduction illustrated in FIG. 7. FIG. 7 illustrates typical time t1 to t5 when the SCR-based air-fuel ratio processing is executed. Hereinafter, the flow of the SCR-based air-fuel ratio processing is described along the passage of time.

First, in a period to time t1, the parameter mdcat is set to "0" by the NSR-side setting processing. Accordingly, since the exhaust gas discharged from the internal combustion engine 1 directly flows into the NSR catalyst 3, the air-fuel ratio of the exhaust gas becomes similar to the air-fuel ratio AFL2 (having a value of about 24) that is leaner than the theoretical air fuel ratio. The $NO_x$ occlusion quantity in the NSR catalyst 3 increments with the passage of time (a value M illustrated in transition of the $NO_x$ occlusion quantity in FIG. 7 is a threshold value used as a trigger to adjust the air-fuel ratio of the exhaust gas to be the specified rich air-fuel ratio, when mdcat is set to "1"). At this time, it is assumed that the catalyst temperature of the SCR catalyst 5 belongs to the specified SCR temperature range, the urea addition request is set to ON in the SCR-side setting processing, and urea water addition from the addition valve 7 is performed. Thus, since the SCR-based air-fuel ratio processing is not executed in the period to time t1, the $NO_x$ occlusion increment $\Delta NO_x$ and the total fuel supply quantity $\Sigma q$ are "0". Since the NSR catalyst 3 occludes $NO_x$ in the exhaust gas in such circumstances, the $NO_x$ concentration on the downstream side of the NSR catalyst 3 is low. Since $NO_x$ reduction is performed in the SCR catalyst 5 with the urea water added from the addition valve 7 and with ammonia as a reducing agent, the $NO_x$ concentration on the downstream side of the SCR catalyst 5 is also low.

At time t1, the catalyst temperature of the NSR catalyst 3 belongs to the specified NSR temperature range, and the parameter mdcat is set to "2" in the NSR-side setting processing. As a result, the SCR-based air-fuel ratio processing is started. At the start time of the processing, the $NO_x$ occlusion quantity in the NSR catalyst 3 is equal to or more than m2. Consequently, in S301, positive determination is made. Since fuel supply from the fuel supply valve 6 is not yet started, negative determination is made in S302. In S303, since the $NO_x$ occlusion increment $\Delta NO_x$ is "0" and the parameter $NO_xf$ is "0" either, positive determination is made. Furthermore, in S305, since the total fuel supply quantity $\Sigma q$ is "0" and the parameter Q is "0" either, positive determination is made. As a result, at time t1, the first air-fuel ratio processing is started in S306. At this time, the air-fuel ratio of the exhaust gas flowing into the NSR catalyst 3 becomes the first lean air-fuel ratio AFL1. Then, in S307, the fuel supply quantity q from the fuel supply valve 6 is integrated, and the parameter Q is set to Q1. As described before, the value Q1 is the total quantity of fuel corresponding to the quantity of the occluded $NO_x$ assumed to be emitted from the NSR catalyst 3 in the first air-fuel ratio processing. That is, the value Q1 is the total quantity of fuel required to emit an assumed quantity of occluded $NO_x$ in the range where a $NO_x$ flow-out quantity from the exhaust gas control system can be suppressed during the first air-fuel ratio processing.

When the processing of S307 is ended, the SCR-based air-fuel ratio processing is repeated from S301 again. Accordingly, after the first air-fuel ratio processing is started at time t1, positive determination is made in S301, and then positive determination is made in S302 before the processing reaches S305. Although the total fuel supply quantity $\Sigma q$ is increased by the first air-fuel ratio processing, it does not yet reach Q1 set in S307. Accordingly, positive determination is made in S305, and processing of S306 and S307 is performed in sequence.

As described in the foregoing, in a period after time t1 and before time t2 described later, the first air-fuel ratio processing continues, so that the $NO_x$ occluded in the NSR catalyst 3 is emitted. Accordingly, the $NO_x$ occlusion quantity is reduced. Since the emitted $NO_x$ has the first lean air-fuel ratio AFL1 that is leaner than the theoretical air fuel ratio, the $NO_x$ is substantially not reduced in the NSR catalyst 3, but flows into the SCR catalyst 5. When the air-fuel ratio of the exhaust gas flowing into the NSR catalyst 3 is adjusted to be the first lean air-fuel ratio AFL1, the air-fuel ratio of the exhaust gas flowing out of the NSR catalyst 3 (i.e., the air-fuel ratio of the exhaust gas flowing into the SCR catalyst 5) does not immediately approximate the first lean air-fuel ratio AFL1 (see the transition of the broken line L4). At this time, in the SCR catalyst 5, the air-fuel ratio of the exhaust gas that allows continuous reduction of $NO_x$ is maintained. Therefore, the $NO_x$ emitted from the NSR catalyst 3 is adequately reduced by the SCR catalyst 5.

When the first air-fuel ratio processing continues for a while, the air-fuel ratio of the exhaust gas flowing into the SCR catalyst 5 also becomes the first lean air-fuel ratio AFL1. Although the first lean air-fuel ratio AFL1 is leaner than the theoretical air fuel ratio, it is still the air-fuel ratio formed by fuel supply from the fuel supply valve 6 performed in the first air-fuel ratio processing. Therefore, the first air-fuel ratio processing hinders smooth valence recovery of the copper ion in the SCR catalyst 5, which results in deterioration in the $NO_x$ reduction capacity of the SCR catalyst 5. Accordingly, in the present embodiment, negative determination is made in S305, so that the first air-fuel ratio processing is ended when the total fuel supply quantity $\Sigma q$ exceeds Q1 set in S307. In FIG. 7, negative determination is made because the total fuel supply quantity $\Sigma q$ exceeds Q1 in S305 at time t2.

Alternatively, coming of time t2 may be determined when the air-fuel ratio of the exhaust gas flowing out of the NSR catalyst 3 detected by the air fuel ratio sensor 10 becomes the first lean air-fuel ratio AFL1, and thereby the $NO_x$ reduction capacity of the SCR catalyst 5 is deteriorated. Further alternatively, coming of time t2 may be determined when the $NO_x$ purification rate by the SCR catalyst 5 calculated by the $NO_x$ sensors 11, 13 becomes less than a reference purification rate, and thereby the $NO_x$ reduction capacity of the SCR catalyst 5 is deteriorated. Still alternatively, coming of time t2 may be determined when the detection value of the $NO_x$ sensor 13 exceeds a reference $NO_x$ concentration relating to $NO_x$ outflow from the SCR catalyst 5 attributed to deterioration in the $NO_x$ reduction efficiency in the SCR catalyst 5, and thereby the $NO_x$ reduction capacity of the SCR catalyst 5 is deteriorated.

Accordingly, as a result of negative determination made in S305, the second air-fuel ratio processing is started at time t2 in S308. At this time, the air-fuel ratio of the exhaust gas flowing into the NSR catalyst 3 becomes the second lean air-fuel ratio AFL2. Then, in S309, the total fuel supply quantity $\Sigma q$ is reset to "0", and the parameter Q is also reset to "0". The parameter $NO_xf$ is set to $NO_xh$.

When the processing of S309 is ended, the SCR-based air-fuel ratio processing is repeated again from S301. Accordingly, after time t2 when the second air-fuel ratio processing is started, the $NO_x$ occlusion quantity in the NSR catalyst 3 increases, and therefore positive determination is also made in S301. Then, negative determination is made in S302 since fuel supply from the fuel supply valve 6 is stopped. Then, in S303, it is determined whether or not the $NO_x$ occlusion increment $\Delta NO_x$ from time t2 that is the latest fuel supply stop time is equal to or more than $NO_xh$ set in S309. Therefore, when the period in which the second air-fuel ratio processing continues from time t2 is short, the $NO_x$ occlusion increment $\Delta NO_x$ does not yet reach $NO_xh$. In this case, the processing proceeds to S304. In S304, determination is made based on the $NO_x$ occlusion quantity in the NSR catalyst 3. With such a configuration, when the $NO_x$ occlusion increment $\Delta NO_x$ does not yet reach $NO_xh$ and the $NO_x$ occlusion quantity is smaller than the upper limit threshold m2', the SCR-based air-fuel ratio processing is ended once and is restarted. That is, the second air-fuel ratio processing continues.

When the duration of the second air-fuel ratio processing is prolonged to some extent, and the $NO_x$ occlusion increment $\Delta NO_x$ reaches $NO_xh$ (positive determination in S303) or the $NO_x$ occlusion quantity becomes more than the upper limit threshold m2' (positive determination in S304), the processing subsequent to S305 is performed, the second air-fuel ratio processing is stopped and switched to the first air-fuel ratio processing. More specifically, in the present embodiment, the duration of the second air-fuel ratio processing is a period of the time until the increment of the $NO_x$ occlusion quantity in the NSR catalyst 3 reaches a predetermined quantity ($NO_xh$) due to the second air-fuel ratio processing or a period of the time until the $NO_x$ occlusion quantity itself reaches the quantity (m2') set so as to prevent excessive increment. Alternatively, the second air-fuel ratio processing may be stopped, and the processing subsequent to S305 may be performed, when the air-fuel ratio of the exhaust gas flowing out of the NSR catalyst 3 detected by the air fuel ratio sensor 10 upon execution of the second air-fuel ratio processing becomes the second lean air-fuel ratio AFL2 or air-fuel ratios in the vicinity of the second lean air-fuel ratio AFL2 (also referred to as "air-fuel ratios such as the second lean air-fuel ratio AFL2" below). This is because when the air-fuel ratio of the exhaust gas flowing out of the NSR catalyst 3 becomes air-fuel ratios such as the second lean air-fuel ratio AFL2, it is considered that oxygen required for valence recovery of the copper ion in the SCR catalyst 5 can soon be supplied to the SCR catalyst 5 positioned on the downstream side of the NSR catalyst 3. When the processing proceeds to S305, positive determination is made in S305 since the total fuel supply quantity Σq and the parameter Q are "0". As a result, the processing proceeds to S306, and thereby the second air-fuel ratio processing is ended. Then, the first air-fuel ratio processing is started for the second time, and the start time of the processing is time t3. In FIG. 7, time t3 comes when the $NO_x$ occlusion increment $\Delta NO_x$ reaches $NO_xh$.

Once the first air-fuel ratio processing is started for the second time in S306 at time t3, then in S307, the fuel supply quantity q from the fuel supply valve 6 is integrated (the total fuel supply quantity Σq in this case is the total quantity on the basis of the start time of the first air-fuel ratio processing for the second time). At the same time, the parameter Q is set to Q1, and the SCR-based air-fuel ratio processing is again repeated from S301. The subsequent flow of the first air-fuel ratio processing for the second time are different from that of the first air-fuel ratio processing for the first time described before. That is, the processing proceeds to S308 when negative determination is made in S301 (time t4) on the grounds that the $NO_x$ occlusion quantity in the NSR catalyst 3 became less than the lower limit threshold m2 in S301, before the total fuel supply quantity Σq exceeds Q1 set in S307. Then, the second air-fuel ratio processing is started for the second time.

When the second air-fuel ratio processing is started for the second time at time t4 in S308, then in S309, the total fuel supply quantity Σq is reset to "0" and the parameter Q is also reset to "0". The parameter $NO_xf$ is set to $NO_xh$. Then, the SCR-based air-fuel ratio processing is repeated again from S301. The subsequent flow of the second air-fuel ratio for the second time continues, as in the second air-fuel ratio processing for the first time, until the $NO_x$ occlusion increment $\Delta NO_x$ reaches $NO_xh$ (positive determination in S303), or until the $NO_x$ occlusion quantity becomes equal to or more than the upper limit threshold m2' (positive determination in S304). Then, in S305, positive determination is made and the processing proceeds to S306 since the total fuel supply quantity Σq and the parameter Q are "0". As a consequence, the first air-fuel ratio processing is started for the third time, and the start time of the processing is time t5.

After time t5, the first air-fuel ratio processing and the second air-fuel ratio processing are alternately repeated as described before until the value of the parameter mdcat is changed to values other than "2" in the NSR-side setting processing.

Thus, in the exhaust gas control system of the internal combustion engine 1 according to the present embodiment, the SCR-based air-fuel ratio processing is provided. Accordingly, even when the catalyst temperature of the NSR catalyst 3 belongs to the specified NSR temperature range, $NO_x$ reduction is mainly executed by the SCR catalyst 5 whose catalyst temperature belongs to the specified SCR temperature range, while $NO_x$ reduction in the NSR catalyst 3 is substantially not performed. When the SCR-based air-fuel ratio processing is executed, the first air-fuel ratio processing and the second air-fuel ratio processing are repeatedly executed in an alternate manner. Accordingly, the $NO_x$ occlusion quantity in the NSR catalyst 3 is decreased, and the $NO_x$ emitted in the processing is reduced by the SCR catalyst 5, while valence recovery of the copper ion in the SCR catalyst 5 is achieved. As a result, continuous reduction treatment of the emitted $NO_x$ is adequately performed by the SCR catalyst 5, which suppresses discharge of $NO_x$ to the outside of the system. As a result, while the SCR catalyst 5-based $NO_x$ reduction is performed, the $NO_x$ occlusion quantity in the NSR catalyst 3 can be maintained to be a relatively small quantity that is hardly influenced by such factors as increase in load of the internal combustion engine. In the SCR-based air-fuel ratio processing illustrated in FIG. 6, the first air-fuel ratio processing and the second air-fuel ratio processing are executed such that the $NO_x$ occlusion quantity in the NSR catalyst 3 belongs to the occlusion quantity range (corresponding to the specified $NO_x$ occlusion quantity range of the present disclosure) of the lower limit threshold m2 to the upper limit threshold m2'. However, the $NO_x$ occlusion quantity in the NSR catalyst 3 in the SCR-based air-fuel ratio processing may be out of the occlusion quantity range as long as the $NO_x$ purification capacity of the exhaust gas control system allows. In the SCR-based air-fuel ratio processing, the supplied fuel component is less likely to be discharged to the outside of the system since the air-fuel ratio of the exhaust gas flowing into the NSR catalyst 3 is leaner than the stoichiometric air-fuel ratio.

Therefore, in order to suppress discharge of $NO_x$ from the exhaust gas control system to the outside as much as possible, the fuel supply quantity α from the fuel supply valve 6 per unit time at the time of the first air-fuel ratio processing is preferably the fuel supply quantity that is an emission quantity of $NO_x$ that can be reduced in the SCR catalyst 5 on the downstream side.

In the second air-fuel ratio processing in the aforementioned SCR-based air-fuel ratio processing, the second lean air-fuel ratio AFL2 is formed by stopping the fuel supply from the fuel supply valve 6 in S308. Instead of this mode, in S308, the fuel supply quantity from the fuel supply valve 6 may be controlled to the quantity smaller than the value α in the range where the valence of the copper ion in the SCR catalyst 5 can be recovered. As a result, the air-fuel ratio of the exhaust gas flowing into the SCR catalyst 5 is adjusted to be leaner than the first lean air-fuel ratio AFL1.

What is claimed is:

1. An exhaust gas control system comprising:
   an NSR catalyst that is a NOx storage reduction catalyst provided in an exhaust passage of an internal combustion engine;
   a fuel supply device configured to supply fuel to exhaust gas flowing into the NSR catalyst and control an air-fuel ratio of the exhaust gas;
   an SCR catalyst provided on a downstream side of the NSR catalyst in the exhaust passage, the SCR catalyst being configured to selectively reduce NOx with ammonia as a reducing agent;
   an addition device configured to add one of ammonia and a precursor of ammonia as an additive to the exhaust gas flowing into the SCR catalyst; and
   an electronic control unit configured to
   when a temperature of the NSR catalyst is a temperature in a specified NSR temperature range where NOx is reduced by the NSR catalyst, and a temperature of the SCR catalyst is a temperature in a specified SCR temperature range where NOx is reduced by the SCR catalyst, i) add the additive by the addition device, and ii) repeatedly perform first air-fuel ratio processing and second air-fuel ratio processing in an alternate manner, the first air-fuel ratio processing being processing where fuel supply by the fuel supply device is controlled such that the air-fuel ratio of the exhaust gas flowing into the NSR catalyst becomes a first lean air-fuel ratio leaner than a theoretical air-fuel ratio, the first lean air-fuel ratio being an air fuel ratio that causes emission of the NOx occluded in the NSR catalyst, the second air-fuel ratio processing being processing where fuel supply by the fuel supply device is controlled such that the air-fuel ratio of the exhaust gas flowing into the NSR catalyst becomes a second lean air-fuel ratio leaner than the first lean air-fuel ratio.

2. The exhaust gas control system according to claim 1, wherein the electronic control unit is configured to control the air-fuel ratio of the exhaust gas flowing into the NSR catalyst by the fuel supply device such that a NOx occlusion quantity in the NSR catalyst is a quantity within a specified NOx occlusion quantity range.

3. The exhaust gas control system according to claim 1, wherein the electronic control unit is configured to stop fuel supply by the fuel supply device in the second air-fuel ratio processing such that the air-fuel ratio of the exhaust gas flowing into the NSR catalyst becomes the second lean air-fuel ratio.

4. The exhaust gas control system according to claim 3, wherein the electronic control unit is configured to stop the second air-fuel ratio processing and switch to the first air-fuel ratio processing when the air-fuel ratio of the exhaust gas flowing out of the NSR catalyst in the second air-fuel ratio processing becomes an air-fuel ratio in a vicinity of the second lean air-fuel ratio including the second lean air-fuel ratio.

5. The exhaust gas control system according to claim 1, wherein the electronic control unit is configured to switch the first air-fuel ratio processing to the second air-fuel ratio processing and continue the second air-fuel ratio processing for a predetermined period when a NOx purification rate by the SCR catalyst is less than a specified purification rate threshold value during the first air-fuel ratio processing.

* * * * *